United States Patent [19]

Loomans

[11] Patent Number: 4,752,135

[45] Date of Patent: Jun. 21, 1988

[54] MIXING APPARATUS AND METHODS

[75] Inventor: Bernard A. Loomans, Saginaw, Mich.

[73] Assignee: Baker Perkins, Inc., Saginaw, Mich.

[21] Appl. No.: 936,669

[22] Filed: Dec. 1, 1986

[51] Int. Cl.$^4$ .............................................. B29B 7/48
[52] U.S. Cl. .................................... 366/85; 366/75; 366/82; 366/97; 366/297; 425/204; 425/209
[58] Field of Search ............................ 366/75, 82–86, 366/97, 100, 297–299, 307; 425/200, 201, 203–205, 209

[56] References Cited

U.S. PATENT DOCUMENTS

| | | | |
|---|---|---|---|
| 2,670,188 | 2/1954 | Erdmenger | 366/97 |
| 3,195,868 | 7/1965 | Loomans et al. | 366/85 |
| 3,347,528 | 10/1967 | List et al. | 366/75 |
| 3,407,438 | 10/1968 | Selbach | 366/85 |
| 3,490,750 | 1/1970 | Brennan, Jr. | 366/85 |
| 3,719,350 | 3/1973 | Loomans | 366/82 X |
| 4,236,833 | 12/1980 | Blach | 366/85 |
| 4,299,499 | 11/1981 | Buchheit | 366/85 |
| 4,650,338 | 3/1987 | List et al. | 366/298 X |

Primary Examiner—John Petrakes
Attorney, Agent, or Firm—Learman & McCulloch

[57] ABSTRACT

A mixer having an elongate barrel with an interior wall defining a mixing chamber, at least a pair of shafts extending axially within the barrel driven in the same direction of rotation and at the same speed of rotation, and mixing elements on each of the shafts. Radially opposite paddles are on each of the shafts, each comprising hub portions and wing portions radially spaced from the hub portions. The wing portions extend axially to overlie the hub portions and each wing portion has a radially inner surface generating the configuration of the radially inner surface of a wing portion on the radially adjacent paddle and further has a radially outer surface generating hub portions of the radially adjacent paddle, and the wall of the chamber.

20 Claims, 4 Drawing Sheets

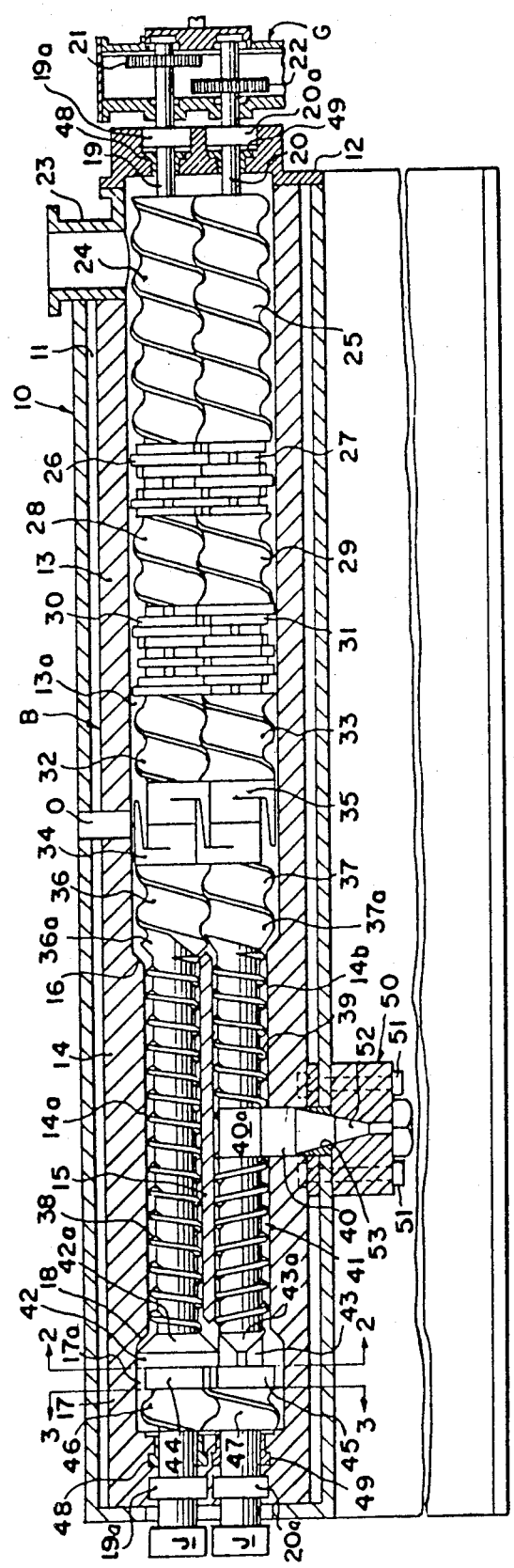
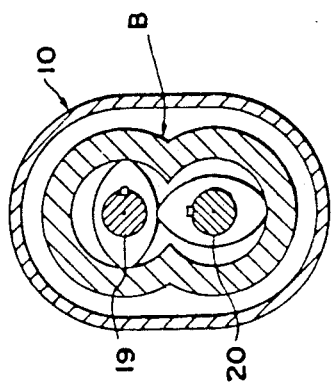
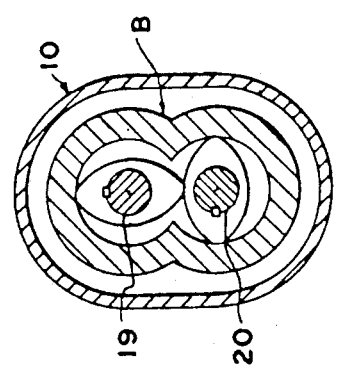
FIG.1
FIG.2
FIG.3

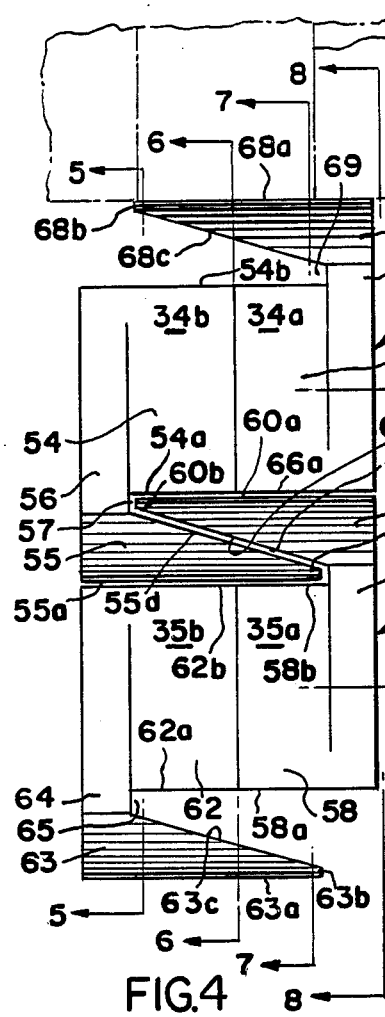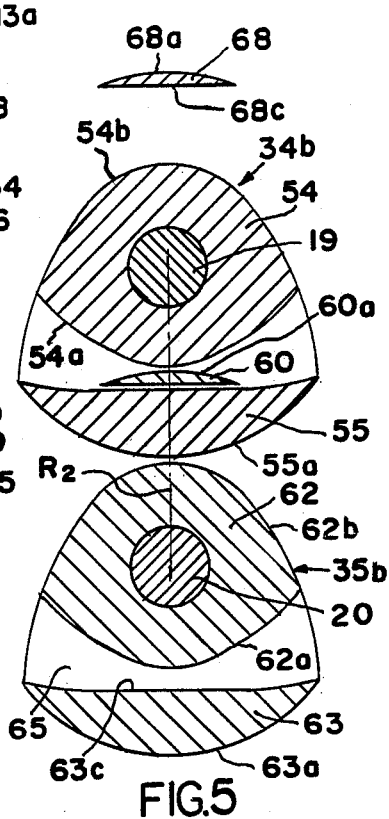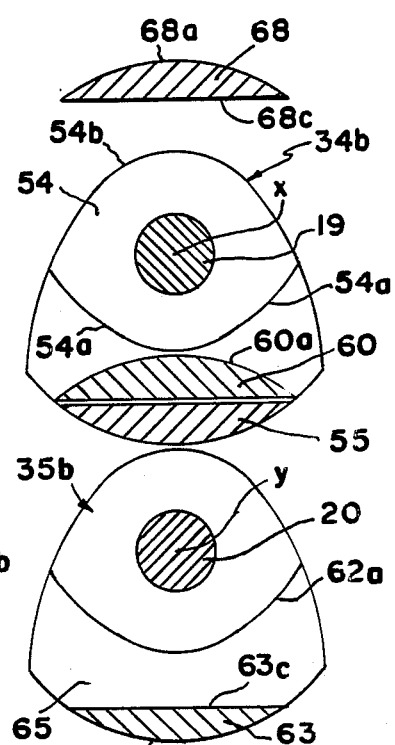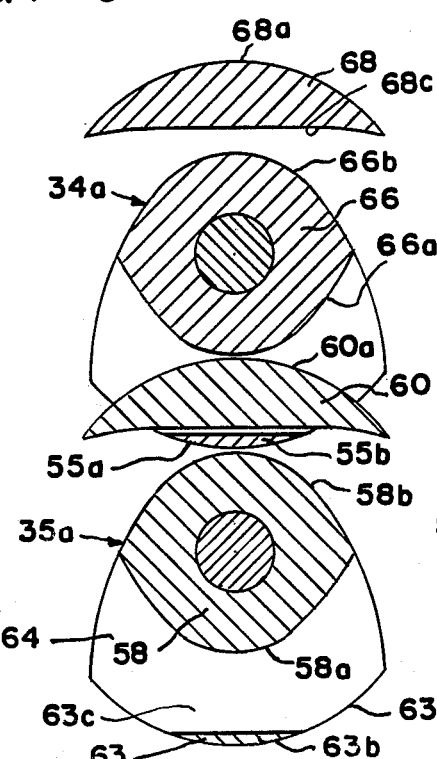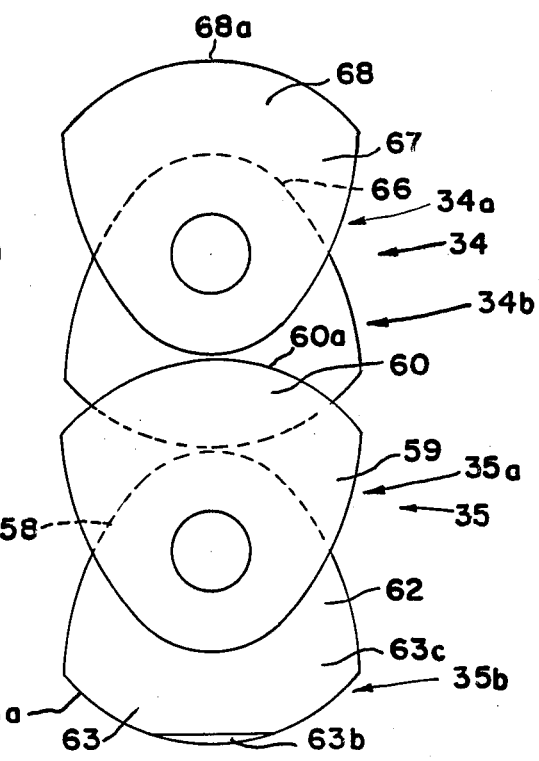

MIXING APPARATUS AND METHODS

BACKGROUND OF THE INVENTION

This invention relates to a continuous self-wiping, mixing system, wherein materials are charged to the mixer at one end, and continuously discharged at the other. Moreover, the invention relates to mixers which are capable of uniformly mixing critical materials such as high energy fuels which are potentially explosive.

Mixers, of the character to which this invention relates, employ twin shafts, rotating in the same direction and at the same speed, which have radially interengaging paddles configured to wipe both the opposing paddle surfaces and the mixing barrel surfaces. The present assignee's Loomans U.S. Pat. No. 3,195,868 describes a mixer of this general character as does Erdmenger U.S. Pat. No. 2,670,188.

One embodiment disclosed in the aforementioned Loomans et al patent, relates to a mixing paddle member made up of a pair of circumferentially offset paddle sections which have wings which intermesh with like wings provided on a radially opposite paddle member. However, the wings are not self-wiping in the sense that the radially inner surfaces of the wings on one paddle member generate the radially inner surfaces of the wings on the other paddle member, and self-wiping between these surfaces can occur.

SUMMARY OF THE INVENTION

The mixer to be described is particularly useful for a mixing operation which cannot tolerate dead spots where material being mixed can collect and degradate. It contemplates and achieves mixing paddles with intermeshing wings which are completely self-wiping. Mixing paddles of this character are, for example, useful adjacent vent openings which must be provided in the mixer barrel to keep the material being mixed from being forced out the vent openings with the escaping gases or vapors.

One of the prime objects of the present invention is to provide a mixer of the character described with unique paddle members which function well to mix material, as well as to prevent material in the mixer from being forced out the vents which are necessary in most mixing operations to vent air or other gases or vapors.

Another object of the invention is to provide a mixer with paddle members which provide intermeshing wings, and yet are still completely self-wiping in nature, so as to avoid the formation of dead spots in the mixing operation.

Another object of the invention is to provide winged paddle members which are configured to permit material to move radially inwardly, and minimize forces which would tend to force material out the vent opening.

Still another object of the invention is to provide unique mixer paddle members which provide a free flow of the material being mixed past the vent opening.

Another object of the invention is to provide winged agitator paddle members which increase the volume of material exposed to vacuum or vapor draw-off forces at the vent openings without tending to force material out the vent openings.

Still another object of the invention is to provide highly reliable paddle members for a mixer of the character described, which can be fabricated and machined without undue difficulty, and accordingly can be relatively economically marketed.

Still a further object of the invention is to provide a mixer having unique mixer paddle members which tend to enhance heat transfer to the temperature controlled medium which is circulated in the mixer to precisely control the temperature of mixing and the build-up of heat which otherwise would occur from the continuous agitating and working of the material being processed.

Other objects and advantages of the invention will be pointed out specifically or will become apparent from the following description when it is considered in conjunction with the appended claims and the accompanying drawings.

IN THE DRAWINGS

FIG. 1 is a schematic, sectional, elevational view illustrating a mixer-extruder, in which completely interwiping paddle members of the present invention are employed at the vent openings;

FIG. 2 is an enlarged, transverse, sectional view taken on the line 2—2 of FIG. 1;

FIG. 3 is an enlarged, transverse, sectional view taken on the line 3—3 of FIG. 1;

FIG. 4 is an enlarged, side elevational view of the vent related paddle members shown in FIG. 1;

FIG. 5 is a transverse, sectional view taken on the line 5—5 of FIG. 4;

FIG. 6 is a transverse, sectional view taken on the line 6—6 of FIG. 4;

FIG. 7 is a transverse, sectional view taken on the line 7—7 of FIG. 4;

FIG. 8 is an end elevational view, taken on the line 8—8 of FIG. 4;

Figure 12:
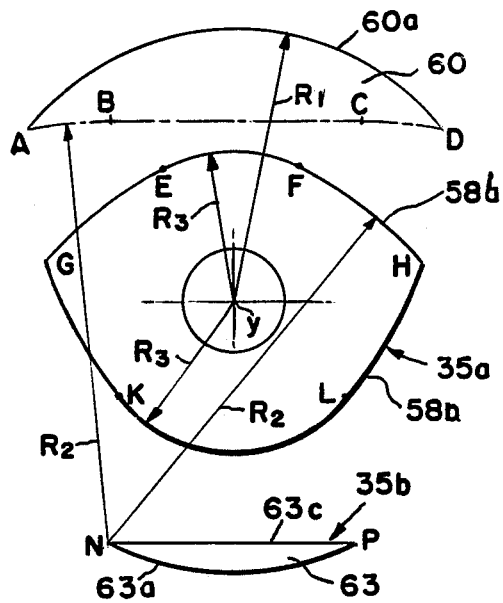
Figure 13:
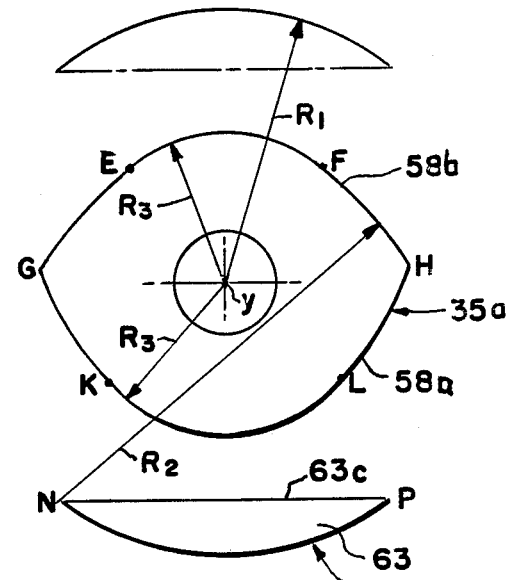
Figure 14:
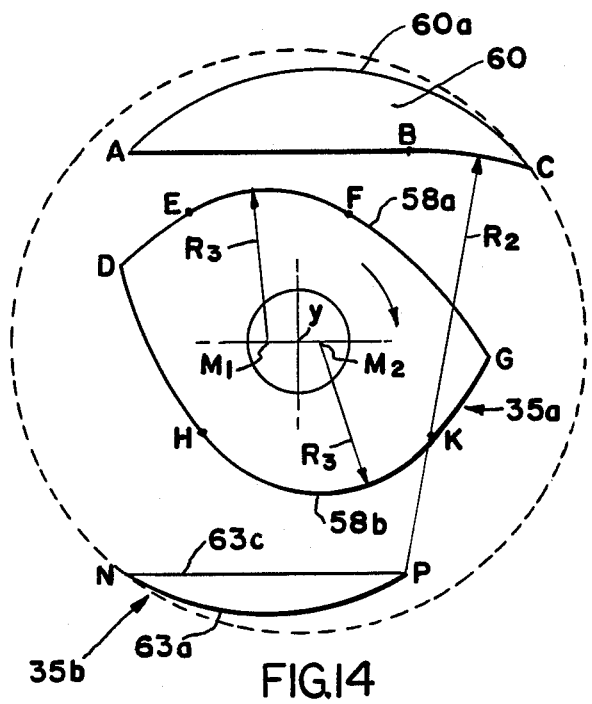
Figure 15:
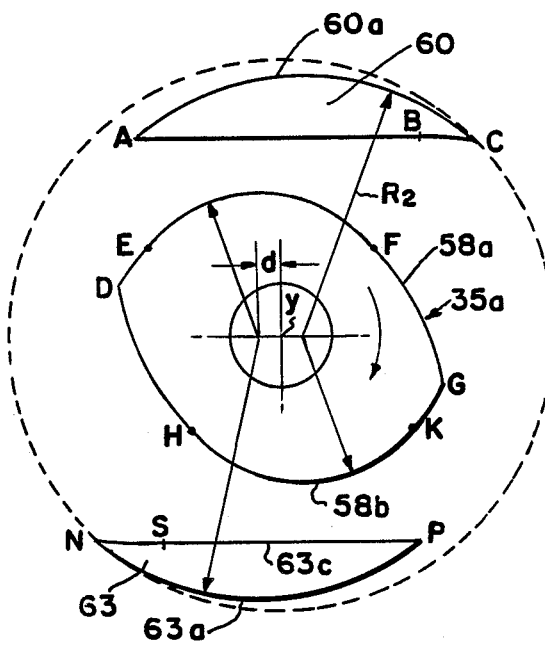
Figure 16:
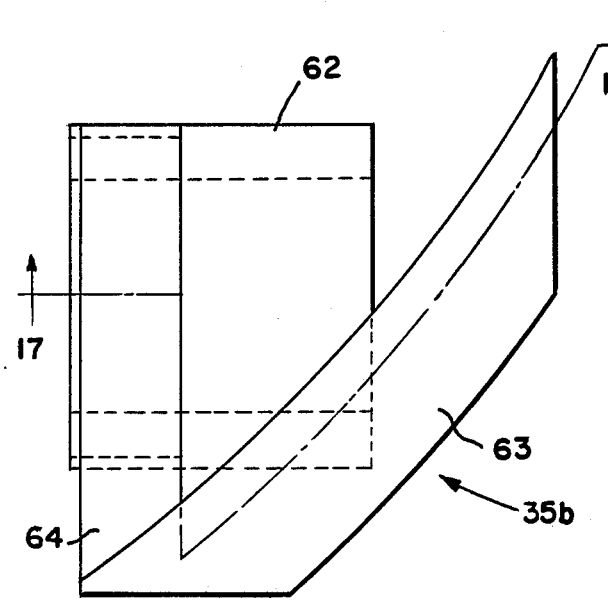
Figure 17:
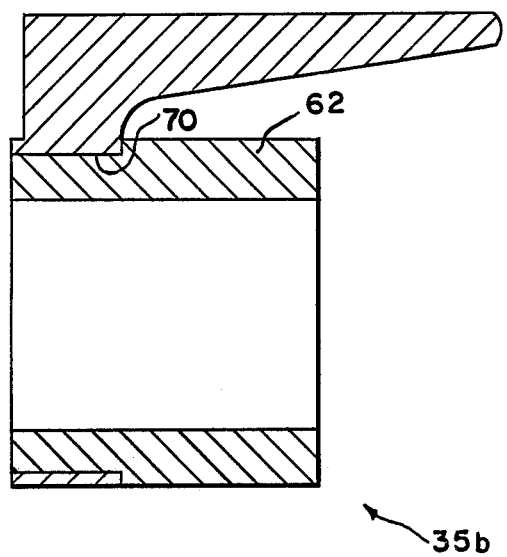
Figures 9, 10, 11:
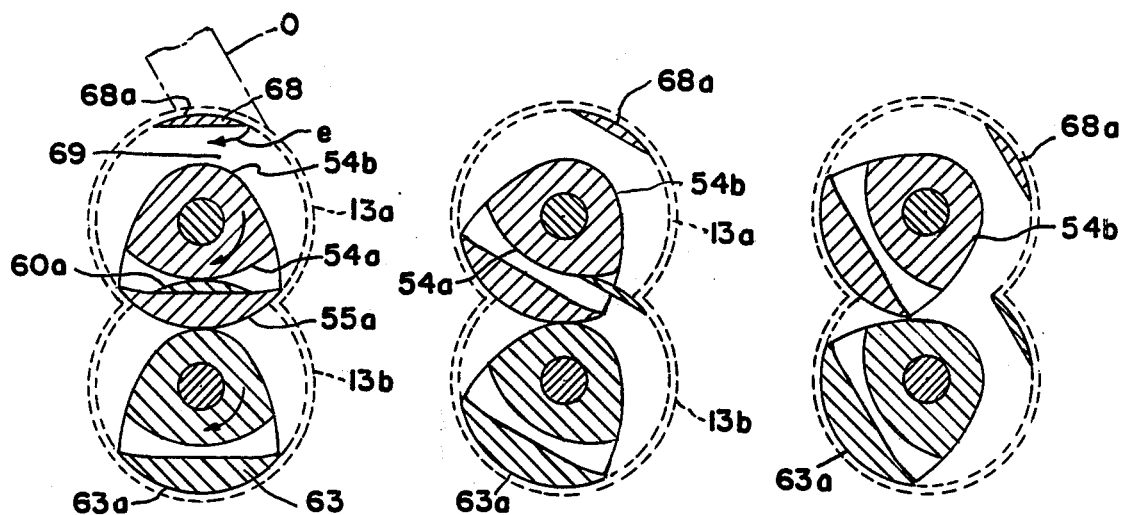

FIGS. 9-11 are schematic, transverse, sectional views on a reduced scale with the section through the paddle members being taken on the line 5—5 of FIG. 4, views 10 and 11 illustrating progressive positions of the identical paddle elements as they rotate in the same direction and at the same speed;

FIG. 12 is an enlarged, schematic, geometric view, particularly illustrating the configuration of a paddle element, with the view taken as though on line 5—5 of FIG. 4;

FIG. 13 is a similar view taken as though along line 6—6 of FIG. 4;

FIG. 14 is a similar view of a modified embodiment similar to FIG. 12, in which, however, the wing sections are circumferentially offset;

FIG. 15 is a view of the modified embodiment similar to FIG. 13;

FIG. 16 is an enlarged, elevational view of one section of another modified mixer paddle assembly; and FIG. 17 is a cross-sectional view, taken on the line 17—17 of FIG. 16.

Referring now more particularly to the accompanying drawings for an understanding of the invention and one environment in which it finds use, a mixing barrel housing, generally designated 10 is disclosed, which can be jacketed or cored as at 11 to permit the circulation of a suitable liquid coolant which may be water or any other temperature control medium. Provided within the housing 10, which is supported on the machine frame 12, is a FIG. 8-shaped barrel B having a barrel portion 13, defining a FIG. 8-shaped mixing chamber 13a. At the discharge end of chamber 13a, a pair of annular, independent, reduced diameter screw chambers 14a and 14b are provided in a discharge section 14 of the barrel B to extend axially from the chamber 13a, chambers 14a and 14b being separated one from the other by a wall 15. A transition section 16 is provided within barrel B between the mixing chamber 13a and the chambers 14a and 14b.

Provided downstream from the axially extending chambers 14a and 14b, is an end pass chamber 17a in the downstream end portion 17 of barrel B. A transition portion 18 for end pass chamber 17a is provided in the barrel B leading from the two separate chambers 14a and 14b to the end pass chamber or cavity 17a, which is of FIG. 8 cross-section and of the same size as the mixing portion 13 of the barrel B. Section 18 which leads from the two annular bores 14a and 14b is of progressively increasing figure-8 cross-section.

Provided to extend axially through the chambers 13a, 14a, 14b, and 17a are twin shafts 19 and 20, which are supported in roller bearings 19a and 20a suitably provided at both ends of the machine. Gears 21 and 22, keyed to the shafts 19 and 20, can be suitably driven by a suitable motor (not shown) via gears in a gear box G, to rotate the shafts 19 and 20 in the same direction of rotation, and at the same speed.

Provided at the charge (right) end of the machine is a material supply passage 23, which can be connected in known manner to any continuous supply of material to be mixed or blended in the mixer-extruder. The shafts 19 and 20, at the upstream end of the mixer, have intermeshing, advancing screw sections 24 and 25 of lenticular cross-section keyed thereon in the usual manner. Immediately downstream of the advancing screw sections 24 and 25, are a series of pairs of lenticular mixing paddle elements, keyed to the shafts 19 and 20 in radially interengaging relationship at right angles one to the other. These mixing paddles 26 and 27, which are of the configuration disclosed in the aforementioned Loomans patent, wipe one another, and further wipe the interior wall of the mixer, as do the advancing screw sections 24 and 25. Downstream from paddle sections 26 and 27 are advancing screw sections 28 and 29 of the same configuration as screw sections 24 and 25, and downstream from the screw sections 28 and 29 are further lenticular mixing paddles 30 and 31 of the same configuration as paddles 26 and 27. The sets of paddles 30 and 31 are followed by screw sections 32 and 33 of the same configuration as sections 24 and 25, and downstream therefrom are further mixing paddle members 34 and 35, opposite a vent opening O which permits the venting of air, or gases which have developed during the mixing process and are to be drawn off. The unique paddle members 34 and 35 will shortly be described.

Downstream from the paddle sections 34 and 35, and provided in the terminal end of the mixing chamber 13a, are intermeshing screw sections 36 and 37 of the same lenticular cross-section as sections 24 and 25, which, at their terminal ends, have transition flight portions 36a and 37a of reduced diameter to conform to and wipe the walls of transition surface 16.

The shaft portions 19 and 20 within chambers 14a and 14b are provided with material conveying flights. In the chamber 14a, the shaft 19 is provided with single lead helical conveying flights 38 of the same hand as screw sections 36–37, extending from the transition section 16 of progressively decreasing FIG. 8 cross-section to the transition section 18. The flights 38 convey the material via drag forces only without pressure generation. In the extrusion chamber 14b, the shaft 20 is provided, for a portion of its length, with twin lead helical flights 39, and, downstream from a radial discharge orifice or port 40, twin lead flights 41, which are identical to the flights 39, except that they are of opposite hand. Provided axially between flights 39 and 41 is an annular space or chamber 40a of a predetermined volume, which will receive material in the volume delivered under pressure by both flights 39 and 41 and express it radially in a continuous stream Provided on the shafts 19 and 20, within the end pass chamber 17a, are a first set of mating, interwiping paddles of lenticular cross section 42 and 43, each of which includes a transition section 42a and 43a, respectively, of the same progressively increasing cross-section. Operating in radially interengaging relationship in the end pass chamber 17a immediately downstream of the paddles 42 and 43, are mixing and blending transfer paddles 44 and 45 of lenticular cross-section, which similarly may be keyed to the shafts 19 and 20.

Finally, and also provided on each of the shafts 19 and 20, is a helical flight portion, designated 46 on the shaft 19 and 47 on the shaft 20, which is of the same size as the screw sections 32 and 33, for example, but of opposite hand. Conventional low pressure stuffing glands 48 and 49 are all that are necessary at both ends of the machine, inasmuch as the screw sections 46 and 47 are never filled with material, so there is never any material axial pressure on the seals or glands 48 and 49.

Connected to the housing wall 10, opposite the radial outlet opening 40 in the barrel section 14, is an extruding orifice block 50, which can be bolted in position as at 51, and which provides an extruding orifice 52 of a particular size or configuration. A nozzle block 53, which is provided in the housing 10, functions as a channeling device in the usual manner. Of course, blocks 50 may be of varying design to obtain the desired output streams.

The present invention claims the paddles 34 and 35, which are used opposite the vent opening O disclosed in FIG. 1, but which also will find use in other mixing situations. Referring now more particularly to FIGS. 4–8, each of the identical paddle members 34 and 35, which rotate respectively on the shaft axes x and y, is made up of a pair of identical 180° offset, single land paddle elements 34a–34b, and 35a–35b. Paddle element or part 34b includes a central or hub section 54, and a radially outer, integral wing 55, joined to the hub portion 54 by an arm portion 56, at a spaced radial distance from the hub portion 34b to provide an opening 57 between the wing 55 and hub portion 54. Hub portion 54 includes a generated curvilinear flank surface 54a joined to a generated curvilinear flank surface 54b. Similarly, paddle element 35a has a hub portion 58, with flank surfaces 58a and 58b, joined by an arm 59 to a wing 60 which extends axially oppositely to and intermeshes with wing 55 within the opening 57. Wing 55 has a radially outer curvilinear surface 55a, generated by the barrel interior wall. Wing 55 also has a radial tip end surface 55b, which has co-wiping relation with the radially extending arm 59, and a radially inner, axially inclined surface 55d. Finally, wing 55 is of progressively decreasing width, and thickness, and conforms to the shape of opening 61 so as to completely wipe its marginal or bounding surfaces. For purposes of clarity of illustration only, clearances are shown between the elements. The surfaces of wing 60 comprise a radially outer, curvilinear surface 60a, generated by the barrel interior wall, a tip end 60b, in co-wiping relationship with the arm 56, and a radially inner, axially inclined surface 60c.

Paddle element 35b includes a hub 62 with flank surfaces 62a and 62b, joined to a wing 63 by an arm 64 at a spaced radial distance from the hub 62 to provide an opening 65 between the wing 63 and hub 62. Similarly, paddle element 34a includes a hub 66 with flank surfaces 66a and 66b, joined by an arm 67 to a wing 68 at a spaced radial distance from the hub 66 such as to provide an opening 69 between the hub 66 and wing 68. Wing 68 extends axially oppositely to the wing 63 and intermeshes therewith in the same manner as does the wing 55 with the wing 60. Thus, wing 63 includes a radially outer curvilinear surface 63a, generated by the interior wall of the barrel and a radially inner, axially inclined surface 63c. As previously, the tip 63b of wing 63 is in co-wiping relationship with the arm 67, and the tip 68b of wing 68 is in co-wiping relationship with the arm 64, when the wings 68 and 63 are in the intermeshing relationship in which wings 55 and 60 are shown in FIG. 4. The surfaces 63a, 55a, 60a and 68a, as noted, generate, or are generated by, one of the internal cylinder walls 13a and 13b of the figure-8 shaped barrel 13 (see FIGS. 9–11). As FIGS. 5–11 clearly indicate, the surface 55a is also generated by, or generates, the flank surfaces 62b and 58b. Similarly, surface 60a is generated by, or generates, surfaces 54a and 66a, and surface 63a is generated by, or generates, surfaces 54b and 66b. Surface 68a generates, or is generated by, surfaces 62b and 58b. Surfaces 55d and 60c, and also 63c and 68c, are likewise co-generative.

Referring now more particularly to FIG. 12, for an understanding of the geometry involved in each of the paddle elements involved in the paddles 34 and 35, and using the same numerals to describe the various surfaces of paddle element 35a, and wing 63, taken from the FIG. 7 location as demonstrative, it will be apparent that the surface 60a, 58a, 63a and 68a are arcs taken about radius R-1 from the axis y. The arc KL of any of the surfaces 54b, 58a, 62b, and 66a, and the arc EF of surfaces 54a, 58b, 62a, and 66b are arcs circumscribed about the radius R-3 taken from axis y. Arc FH is an arc circumscribed about radius R-2, taken from the point N, and as indicated in FIG. 5, is the center-to-center distance between axes x and y of the shafts 19 and 20. Similarly, arc GE is an arc circumscribed about the radius R-2, taken from the point P. The arc GK is an arc circumscribed about radius R-2 taken from the point D, and arc LH is an arc circumscribed about the radius R-2 taken from the point A.

Surface 63c, and also surfaces 55d, 60c, and 68c, at the juncture of the wings to the arms, include a linear or flat central surface BC and side arcs AB and CD. The arc AB is taken from a radially aligned point N, about center-to-center radius R-2, and the arc CD is taken from radially aligned point P, about the same radius R-2. In the geometric figure (FIG. 13), which corresponds to the FIG. 6 section, the 63c surface is also a linear or flat surface. The reduced width confronting surfaces of the wings 55 and 60 are completely flat at the FIG. 6 location. As the surface 55d proceeds from the FIG. 6 location to the FIG. 5 location, the progressively widening surface 55d will gradually take on the configuration AB-BC-CD. The reduced width terminal end portion of the surface 60c of wing 60 remains completely flat from the FIG. 6 location to its tip 60b. As noted, it is those portions of the radially interior surfaces of wings 55, 68, 63 and 60 which, near the arms which connect them to their hubs, have the configuration AB-BC-CD shown in FIG. 12. Each of the wings, when of the width BC (NP) or less, have linear or flat radially interior surfaces 55b, 60c, 63c and 68c, but, when they increase beyond the width BC to the width AD, they progressively assume the curvature indicated at AB-BC(NP)-CD. For purposes of simplicity, the wings 55, 60, 63 and 68, have been shown as linearly axially extending. However, the wings may extend helically in a manner which will be described.

Also, alternatively, the arms 56, 64, 59 and 67 can be inclined to circumferentially offset the linearly extending wings 55, 63, 60 and 68 a distance d from the hub portions 54, 62, 58 and 66, from which they respectively extend. FIG. 14 indicates what geometrically occurs when this is done to the elements illustrated in FIGS. 12 and 13, and shows what a section taken approximately at the FIG. 7 location would look like. FIG. 15 depicts the FIG. 6 position. In these figures, surfaces 60a and 63a are generated about the same radius R-1 taken from offset centers M-2 and M-1, respectively. The radially outer exterior surfaces 60a and 63a, however, because of the offsets, scrape material from the interior walls of the barrel at the points C and N, without the whole radially exterior surfaces 60a and 63a of the wings being in interwiping engagement with the barrel cylinder, as in the previous embodiment. Here, the radially inner surface 60c of wing 60 of the FIG. 7 position, comprises a linear portion AB, and an arcuate surface BC which is an arc taken on the center-to-center distance radius R-2 from radially aligned point P. The hub surface arcs EF and HK, are taken on the radius R-3 from the displaced centers M-1 and M-2, respectively. As previously, arc FG is taken about the radius R-2 from point N, and arc DE is taken about the radius R-2 from point P. Arc GK is taken about the radius R-2 from point A and arc DH is taken about the radius R-2 from point C. In this version of the invention, the wings 55, 63, 60 and 68, have interior linear flat surfaces when they are of the width AB (NP) or less, but as they progressively increase to the width AC, have surfaces progressively configured as at ABC (NSP).

FIGS. 16 and 17, illustrate the paddle elements which make up paddles 34 and 35, except that the wings are helical, rather than axial and extend helically counter to the direction of rotation. Using element 35b, for example to illustrate, it is to be understood that all of the elements 34a, 34b, 35a and 35b are identical. The hub section 62 is shown as having a recess 70 to receive the arm portion 64 which, previously, has been shown as formed integrally with the hub section. The arm 64 can be rigidly secured to hub 62 in any acceptable manner, such as by welding it in place. With helical wings, torque forces are more gradually applied to the wings.

THE OPERATION

In operation, material fed through the supply or inlet opening 23 at a rate to only partially fill the barrel (i.e., 10–20% of its volume) is advanced by the screw sections 24 and 25, from right to left in FIG. 1, and moved by the various screws 28–29, 32–33, and 36–37 through the mixing channel 13a. The material is mixed or blended by the paddle sections 26–27, 30–31, and 34–35, paddles 34 and 35 functioning to, also, permit the escape of gases, without loss of material, through the vent opening O. A suction pump communicating with vent O may be employed to assist in this draw-off of vapor. With paddles 34 and 35, material which is moved toward the vent opening O in FIG. 9, has a path of escape illustrated by arrow e through opening 69, and is not forced radially outwardly through the vent opening O; which inclines so as to be tangential with the barrel wall on the downstream side of the vent opening. The vent inclination aids the escape of the material which tends to be dragged down along the wall and to move in a counter-direction to paddle rotation through opening 69. While providing the escape route, the wings also intermesh in a manner to fully wipe one another without trapping and compressing material between them. Paddles 34 and 35 are configured to provide a relatively large escape path, and to provide wings 55, 63, 60 and 68 which are of sufficiently large cross-section that they possess the requisite strength to withstand the imposition of torsional forces and stresses. In the FIGS. 16 through 18 version of the invention, the helical wings trail the direction of rotation, and function to advance the material from the charge end of the processor or mixer to the discharge end.

The mixed and blended material proceeds to the separate annular chambers 14a and 14b, and is conveyed therein. Material in the chamber 14a passes through the transition mixer paddles 42 and 43, and to the mixer paddles 44 and 45, which transfer it to the extruder flights 41. This material is then positively conveyed under pressure to the chamber 40a, where it meets material being advanced under positive pressure by the extruder flights 39, with the result that the increased volume of material is forced in a continuous stream and under high radial pressure, out the extruding ports 40, 53 and 52. Approximately fifty percent of the material proceeding through the system is conveyed by flights 41 and approximately fifty percent by flights 39. The end pass chamber 17a has four times the conveying capacity of extruding chamber 14a, so the material in the chamber 17a is essentially transferred at substantially atmospheric pressure and does not exert any substantial axial pressure on glands 48 and 49 which would tend to force material past the glands to the bearings 19a and 20a. The transfer paddles 42-43 and 44-45, thus, maintain the blend of the material while operating in a partially starved mode at all times. Flights 46 and 47 essentially ensure that no material passes axially beyond paddles 44-45.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

I claim:

1. Mixing apparatus comprising:
   a. an elongate, axially extending barrel with an interior wall defining a mixing chamber adapted to receive and mix material, and having an inlet in an inlet end and an outlet in an outlet end, said barrel having at least a pair of parallel intersecting cylinders forming said barrel;
   b. mechanism including at least a pair of barrel mixing shafts having spaced, parallel axes and extending within said cylinders from the inlet end of the barrel chamber to the outlet end, and drive elements for driving said shafts in the same direction of rotation and at the same speed of rotation;
   c. mixing elements on each of said shafts which are in radial interwiping relation within said barrel and configured to wipe one another and the cylinder walls;
   d. said mixing elements including radially opposite paddle members on each of said shafts, each paddle member comprising axially adjacent circumferentially offset paddle elements on one shaft radially adjacent like paddle elements on the other shaft, the paddle elements each comprising a hub portion and a wing portion, radially spaced from the hub portion, the wing portion on one element extending axially to overlie the hub portion of the axially adjacent element, each wing portion having a radially inner surface movable into intermeshed relation with a wing on the radially adjacent paddle member and generating the configuration of the radially inner surface of the said wing on the radially adjacent paddle member, and further having a radially outer surface generating the hub portions on the radially adjacent paddle member, and the wall of one of the barrel cylinders.

2. The apparatus of claim 1 wherein the radially inner surfaces of the wings in interengaging position are substantially flat and are flatwisely engaged with only wiping clearance when the wings are in radially aligned and centered intermeshed relation.

3. The apparatus of claim 1 wherein the paddle members are eccentrically mounted on said shafts and each hub portion is of a configuration in cross section which comprises an arcuate surface taken on a radius from the axis of the shaft on which it is fixed and a radially opposite arcuate surface taken on the same radius from the said axis, the said arcuate surfaces being connected by flank surfaces generated about radii of a length equal to the center-to-center distance between the axes of said shafts taken from the side edges of the wing which intermeshes therewith.

4. The apparatus of claim 1 wherein the wings are of progressively decreasing width and thickness.

5. The apparatus of claim 1 wherein the wings extend helically.

6. The apparatus of claim 1 wherein the paddle elements on the respective shafts are single land paddle shapes substantially 180° circumferentially offset.

7. The apparatus of claim 1 wherein each paddle member has a pair of axially oppositely extending wings displaced circumferentially substantially 180°.

8. The apparatus of claim 1 wherein the wing extends to a free tip and the radially inner surface of each wing from near the intermediate portion thereof to its tip is flat.

9. The apparatus of claim 8 wherein the mid-portion of said radially inner surface of the remainder of said wing is flat and bounded at at least one side by a relatively flat arc taken about radii of a length equal to the center-to-center distance between the axes of said shafts from the side of the wing with which it intermeshes.

10. For use in a mixer comprising an elongate, axially extending barrel with an interior wall defining a mixing chamber comprising at least a pair of parallel intersecting cylinders, at least a pair of mixing shafts having spaced, parallel axes and extending within the cylinders, and drive elements for driving the shafts in the same direction of rotation, and at the same speed of rotation;
   a. mixing elements including radially opposite paddle members on each of the shafts, the paddle members each comprising axially adjacent, circumferentially offset paddle elements on one shaft, and radially adjacent like paddle elements on the other shaft;

b. the paddle elements each comprising a hub portion and a wing portion, radially spaced from the hub portion, the wing portion on one element extending axially to overlie the hub portion of the axially adjacent element;

c. each wing portion having a radially inner surface movable into intermeshed relation with a wing on the radially adjacent paddle member, and generating the configuration of the radially inner surface of the said wing on the radially adjacent paddle member, and further having a radially outer surface which is co-generative with the hub portion on the radially adjacent paddle member.

11. The apparatus of claim 10 wherein the radially inner surfaces of the wings in intermeshed relation are substantially flat and are flatwisely engaged with only wiping clearance when the wings are in radially aligned and centered intermeshed relation.

12. The apparatus of claim 10 wherein the wings extend helically.

13. The apparatus of claim 10 wherein the paddle elements on the respective shafts are single land paddle-shapes substantially 180° circumferentially offset.

14. The apparatus of claim 10 wherein the wings extend to a free tip, and the radially inner surface of each wing from near the intermediate portion thereof to its tip is flat.

15. The apparatus of claim 14 wherein the mid-portion of said radially inner surface of the remainder of said wing is flat and bounded axially at each side by a relatively flat arc taken about radii of a length equal to the center-to-center distance between the axes of the shafts from the sides of the wing on the radially adjacent paddle member with which it intermeshes.

16. The apparatus of claim 10 wherein the wing portions are radially offset from the hub portions to assume a tilted attitude so that only the one edge of the radially outer surface of each wing is in wiping engagement with the wall of a barrel cylinder.

17. A method of mixing in a mixer with an elongate axially extending barrel having an interior wall defining a mixing chamber comprising at least a pair of parallel intersecting cylinders, at least a pair of mixing shafts having spaced, parallel, axes and extending within the cylinders, drive elements for driving the shafts in the same direction of rotation and at the same speed of rotation, mixing elements including radially opposite paddle members on each of the shafts, the paddle members each comprising a hub portion and a pair of oppositely axially extending wing portions, radially spaced from the hub portion, and each wing portion having a radially inner surface movable into intermeshed relation with a wing portion of the radially adjacent paddle member, and generating the configuration of the radially inner surface of the said wing portion on the radially adjacent paddle member, and further having a radially outer surface which is cogenerative with the hub portion on the radially adjacent paddle member, comprising:

a. charging material to be mixed to the mixing chamber;

b. rotating said shafts and said paddle members in the same direction of rotation and at the same speed of rotation;

c. in this rotation bringing the outer surfaces of the wings into wiping engagement with the mixing chamber cylinder in which each rotates to wipe the cylinder wall around its circumference;

d. in this rotation bringing each wing portion on one paddle member into intermeshed relation with a wing portion on the radially adjacent paddle member and bringing the radially outer surface of each wing into wiping engagement with the hub portion of the radially adjacent paddle member, while at the same time bringing the radially inner surface of each wing portion into wiping engagement over its length and width with the radially inner surface of the wing portion with which it intermeshes; and e. discharging material from the mixing chamber.

18. The method defined in claim 17 wherein the shafts are vertically spaced and a vent opening is provided leading upwardly through the barrel from the mixing chamber radially adjacent the uppermost paddle member, a vapor is drawn off from the material being mixed via said vent, and material flow in the direction of rotation adjacent said vent is provided with an escape path permitting it to move between a wing portion and hub of a paddle member counter to the direction of shaft rotation.

19. Mixing apparatus comprising:

a. an elongate, axially extending barrel with an interior wall defining a mixing chamber adapted to receive and mix material, and having an inlet in an inlet end and an outlet in an outlet end, said barrel having at least a pair of vertically spaced parallel intersecting cylinders forming said barrel and a vent passage leading upwardly from the chamber through the barrel for drawing off vapor;

b. mechanism including at least a pair of vertically spaced barrel mixing shafts having spaced, parallel axes and extending within said cylinders from the inlet end of the barrel chamber to the outlet end, and drive elements for driving said shafts in the same direction of rotation and at the same speed of rotation;

c. mixing elements on each of said shafts which are in radial interwiping relation with said barrel and configured to wipe one another and the cylinder walls;

d. said mixing elements including radially opposite paddle members on each of said shafts, each paddle member comprising axially adjacent circumferentially offset paddle elements on one shaft radially adjacent like paddle elements on the other shaft, the paddle elements each comprising a hub portion and a wing portion, radially spaced from the hub portion, the wing portion on one element extending axially to overlie the hub portion of the axially adjacent element, each wing portion having a radially inner surface movable into intermeshed relation with a wing on the radially adjacent paddle member and generating the configuration of the radially inner surface of the said wing on the radially adjacent paddle member, and further having a radially outer surface generating the hub portions on the radially adjacent paddle member, and the wall of one of the barrel cylinders;

e. said vent passage having an inclined wall tangential with the barrel wall on the downstream side of the vent passage.

20. Mixing apparatus comprising:

a. an elongate, axially extending barrel with an interior wall defining a mixing chamber adapted to receive and mix material, and having an inlet in an inlet end and an outlet in an outlet end, said barrel having at least a pair of parallel intersecting cylinders forming said barrel;
b. mechanism including at least a pair of barrel mixing shafts having spaced, parallel axes and extending within said cylinders from the inlet end of the barrel chamber to the outlet end, and drive elements for driving said shafts in the same direction of rotation and at the same speed of rotation;
c. mixing elements on each of said shafts which are in radial interwiping relation within said barrel and configured to wipe one another and the cylinder walls;
d. said mixing elements including radially opposite paddle members on each of said shafts, the paddle members each comprising a hub portion and a pair of oppositely axially extending wing portions, radially spaced from the hub portion, each wing portion having a radially inner surface movable into intermeshed relation with a wing on the radially adjacent paddle member and generating the configuration of the radially inner surface of the said wing on the radially adjacent paddle member, and further having a radially outer surface co-generative with the hub portion of the radially adjacent paddle member, and the wall of the barrel cylinders.

* * * * *

UNITED STATES PATENT AND TRADEMARK OFFICE
CERTIFICATE OF CORRECTION

PATENT NO. : 4,752,135
DATED : June 21, 1988
INVENTOR(S) : Bernard A. Loomans

It is certified that error appears in the above-identified patent and that said Letters Patent is hereby corrected as shown below:

```
Column 5, line 38, "surface" should read -- surfaces --

Column 6, line 28, "of" (second occurrence) should
read -- at --.

Column 9, line 53, "of" should read -- on --.

Column 12, line 12, after "of" insert -- one of --.
```

Signed and Sealed this

Twenty-second Day of November, 1988

Attest:

DONALD J. QUIGG

*Attesting Officer*  *Commissioner of Patents and Trademarks*